US008683745B2

(12) United States Patent
Artwohl et al.

(10) Patent No.: US 8,683,745 B2
(45) Date of Patent: Apr. 1, 2014

(54) REFRIGERATED DISPLAY CASE DOOR WITH TRANSPARENT LCD PANEL

(75) Inventors: Paul J. Artwohl, Sylmar, CA (US); Mark Sandnes, Sylmar, CA (US); John Michael Roche, Bishop, GA (US); Jeffery W. Nicholson, Palmdale, CA (US)

(73) Assignee: Anthony, Inc., Sylmar, CA (US)

( * ) Notice: Subject to any disclaimer, the term of this patent is extended or adjusted under 35 U.S.C. 154(b) by 239 days.

(21) Appl. No.: 13/286,053

(22) Filed: Oct. 31, 2011

(65) Prior Publication Data

US 2012/0285089 A1 Nov. 15, 2012

Related U.S. Application Data

(60) Provisional application No. 61/484,616, filed on May 10, 2011.

(51) Int. Cl.
*E06B 7/00* (2006.01)
*G09G 5/00* (2006.01)
*G09F 9/35* (2006.01)

(52) U.S. Cl.
CPC ... *G09G 5/00* (2013.01); *G09F 9/35* (2013.01)
USPC .......................................... 49/70; 52/786.11

(58) Field of Classification Search
USPC ........ 52/204.1, 204.5, 786.11, 786.13; 49/70, 49/501, 504; 312/116, 138.1, 405, 401; 345/104, 173; 349/90, 106; 362/92, 362/125, 97.2, 97.4
See application file for complete search history.

(56) References Cited

U.S. PATENT DOCUMENTS

| 2,002,322 | A | * | 5/1935 | Kraemer | 49/352 |
| 4,371,870 | A | | 2/1983 | Biferno | |
| 4,671,582 | A | * | 6/1987 | Stromquist et al. | 439/31 |
| 4,893,902 | A | * | 1/1990 | Baughman et al. | 349/16 |
| 4,998,382 | A | * | 3/1991 | Kostos et al. | 49/501 |
| 5,024,023 | A | * | 6/1991 | Kostos et al. | 49/501 |
| 5,111,618 | A | * | 5/1992 | Kaspar et al. | 49/501 |
| 5,116,274 | A | * | 5/1992 | Artwohl et al. | 312/116 |
| 5,255,473 | A | * | 10/1993 | Kaspar et al. | 49/501 |
| 5,270,843 | A | * | 12/1993 | Wang | 349/90 |
| 5,645,330 | A | * | 7/1997 | Artwohl et al. | 312/116 |
| 6,005,652 | A | * | 12/1999 | Matsuhira | 349/149 |
| 6,148,563 | A | * | 11/2000 | Roche et al. | 49/501 |
| 6,377,228 | B1 | * | 4/2002 | Jenkin et al. | 345/1.3 |

(Continued)

FOREIGN PATENT DOCUMENTS

JP 2003125904 A * 5/2003 ................ A47F 3/04

OTHER PUBLICATIONS

International Search Report and Written Opinion issued on May 23, 2012 in related PCT/US 12/23934 application.

*Primary Examiner* — William Gilbert
*Assistant Examiner* — James Ference
(74) *Attorney, Agent, or Firm* — Foley & Lardner LLP

(57) ABSTRACT

A door assembly that includes a single glass unit having at least first, second and third panels, a front surface, a rear surface, and an outside edge. At least one of the first, second or third panels is a transparent LCD panel on which media can be displayed. The single glass unit also includes a frame that at least partially surrounds the outside edge of the single glass unit, and electronic components in electrical communication with the LCD panel.

21 Claims, 9 Drawing Sheets

(56) References Cited

U.S. PATENT DOCUMENTS

| | | | |
|---|---|---|---|
| 6,401,399 B1* | 6/2002 | Roche et al. | 49/501 |
| 6,427,772 B1* | 8/2002 | Oden et al. | 165/232 |
| 6,476,885 B1* | 11/2002 | Murray et al. | 349/60 |
| 6,606,832 B2* | 8/2003 | Richardson et al. | 52/204.1 |
| 6,606,833 B2* | 8/2003 | Richardson et al. | 52/204.5 |
| 7,072,096 B2* | 7/2006 | Holman et al. | 359/298 |
| 7,413,233 B1 | 8/2008 | Jung | |
| 7,824,056 B2* | 11/2010 | Madireddi et al. | 362/125 |
| 2003/0117790 A1* | 6/2003 | Lee et al. | 362/31 |
| 2003/0205059 A1* | 11/2003 | Roche et al. | 65/60.1 |
| 2003/0214619 A1* | 11/2003 | Masuda et al. | 349/153 |
| 2004/0073334 A1* | 4/2004 | Terranova | 700/236 |
| 2004/0160388 A1* | 8/2004 | O'Keeffe | 345/30 |
| 2004/0194388 A1* | 10/2004 | Roche et al. | 49/120 |
| 2005/0068629 A1* | 3/2005 | Fernando et al. | 359/609 |
| 2005/0172654 A1* | 8/2005 | Rohrer et al. | 62/246 |
| 2005/0202178 A1* | 9/2005 | Roche et al. | 427/385.5 |
| 2006/0103269 A1* | 5/2006 | Artwohl et al. | 312/116 |
| 2006/0127586 A1* | 6/2006 | Roche et al. | 427/372.2 |
| 2006/0192767 A1* | 8/2006 | Murakami | 345/173 |
| 2007/0003700 A1* | 1/2007 | Roche et al. | 427/372.2 |
| 2007/0016478 A1* | 1/2007 | Hill | 705/14 |
| 2007/0058114 A1* | 3/2007 | Niiyama et al. | 349/106 |
| 2007/0171647 A1* | 7/2007 | Artwohl et al. | 362/276 |
| 2007/0195535 A1* | 8/2007 | Artwohl et al. | 362/341 |
| 2007/0216657 A1* | 9/2007 | Konicek | 345/173 |
| 2008/0158858 A1* | 7/2008 | Madireddi et al. | 362/92 |
| 2009/0036208 A1* | 2/2009 | Pennington et al. | 463/33 |
| 2009/0121970 A1* | 5/2009 | Ozbek | 345/4 |
| 2009/0146945 A1* | 6/2009 | Cho | 345/104 |
| 2009/0295731 A1* | 12/2009 | Kim et al. | 345/168 |
| 2010/0013925 A1* | 1/2010 | Fowler et al. | 348/143 |
| 2010/0026912 A1* | 2/2010 | Ho | 348/836 |
| 2010/0043293 A1* | 2/2010 | Nicholson et al. | 49/70 |
| 2010/0062152 A1* | 3/2010 | Roche et al. | 427/164 |
| 2010/0068398 A1* | 3/2010 | Roche et al. | 427/384 |
| 2010/0083672 A1* | 4/2010 | Yoon et al. | 62/85 |
| 2010/0119705 A1* | 5/2010 | Roche et al. | 427/164 |
| 2010/0152892 A1* | 6/2010 | Gavra et al. | 700/232 |
| 2010/0275477 A1* | 11/2010 | Kim | 40/541 |
| 2010/0293827 A1* | 11/2010 | Suss et al. | 40/593 |
| 2011/0098849 A1* | 4/2011 | Hudis et al. | 700/232 |
| 2011/0116231 A1* | 5/2011 | Dunn et al. | 361/695 |
| 2011/0181792 A1* | 7/2011 | Hammonds | 348/745 |
| 2012/0105424 A1* | 5/2012 | Lee et al. | 345/212 |
| 2013/0063326 A1 | 3/2013 | Riegel | |
| 2013/0271696 A1* | 10/2013 | Dunn | 349/58 |

* cited by examiner

REFRIGERATED DISPLAY CASE DOOR WITH TRANSPARENT LCD PANEL

CROSS REFERENCE TO RELATED APPLICATIONS

This application claims the benefit of U.S. Provisional Application No. 61/484,616 filed May 10, 2011, which is herein incorporated by reference in its entirety.

FIELD OF THE INVENTION

The present invention relates generally to refrigerated display cases and refrigerator doors and, more particularly, to a refrigerator door with a transparent LCD panel.

BACKGROUND OF THE INVENTION

The invention described herein includes the use of a transparent LCD glass panel as one of the panes in a three-pane unit, such as one used in an insulated glass refrigerator/freezer door.

One of the issues with such a door is supplying power, data and/or communications to the components within the refrigerated display case. Glass refrigerator/freezer doors commonly have a mechanism to supply 120VAC or 240VAC power to the door for anti-sweat heaters. Most stores use a traditional electrical cord. This cord flexes in the cold and suffers from copper conductor fatigue, and insulation cracking. To overcome these weaknesses, solutions have been provided in which the electrical conductors are passed through the hinge pin. By running the conductors concentric with the axis of the hinge pin, flexing and fatigue is minimized, thus improving reliability. The high voltage conductors and associated contacts require appropriate insulation and spacing as dictated by UL and other safety certification organizations. See, for example, U.S. Pat. No. 4,671,582 (referred to herein as the "'582 patent"), issued on Jun. 9, 1987 to Stromquist, et al., the entirety of which is incorporated herein by reference.

Other types of refrigerator/freezer doors also require both power and data. For example, LED light fixtures mounted to the swinging door, LED illuminated marquee signs mounted inside the insulated glass assembly of the door, LCD displays mounted on the door handle, and transparent LCD glass panels with advertising all require both power and data. Most of these products require UL Class 2 low voltage (<60VDC), and many require a data supply, e.g. LCD displays with advertising pictures or videos requiring TCP/IP type data communications.

The problem to be overcome is how to provide the DC power and data communications to these devices. Running all the conductors through the prior art electrical hinge pin is difficult due to space limitations. Running all the conductors in a traditional cable suffers from the aforementioned reliability issues with flexing in the cold. Batteries for DC power are a maintenance concern. Transforming the AC power available in the door for anti-sweat heaters requires bulky transformers and capacitors which are difficult to fit into the narrow door rails.

SUMMARY OF THE PREFERRED EMBODIMENTS

Generally, the invention is to use a transparent LCD glass panel as one of the panes in a three-pane unit, such as one used in an insulated glass refrigerator/freezer door. With the transparent LCD panel, a consumer can see the media shown on the LCD panel, but can also see inside the display case/refrigerator to view the contents therein. For example, transparent LCD panels are commercially available from Samsung. In a preferred embodiment, the LCD glass panel is used as the center panel. It is within the scope of the present invention to use the LCD glass panel as the inner or outer pane or to add the LCD glass panel as an additional pane. However, in a preferred embodiment, the LCD glass panel needs to be protected from impact and/or moisture damage. Mounting the panel externally may decrease visible transmittance and would also subject the panel to impact by shopping carts. Also, if the store ambient temperature and humidity are not properly controlled, the door can be subject to condensation which may damage the LCD panel or associated electronics. Mounting the panel inside the freezer (adjacent to the food) may cause condensation when the door is opened. Housing the LCD panel inside the hermetically sealed glass unit protects the panel from condensation damage. The associated electronics can also optionally be mounted inside the hermetically sealed glass assembly to protect them from condensation damage. In another embodiment, the electronics can be mounted outside the hermetically sealed glass assembly, such as in the rail of the door.

The door preferably includes the following distinctive features: (1) transparent LCD panel functioning as the center insulating pane of a three-pane low-temp glass freezer door to maximize visible transmittance while maintaining thermal insulating performance; (2) transparent LCD panel mounted between an inner and outer pane of glass to it protect from impact damage; (3) transparent LCD panel mounted inside the hermetically sealed glass unit to protect from moisture damage; (4) mounting the associated electronics, wires, and media player inside the sealed glass unit to protect it from moisture damage or inside the rail of the door; (5) using selectively decorated opaque areas (e.g. screen printing, dot matrix decorating, roller printing, ink jet printing, painting or the like) of the outer or inner pane of glass to hide the circuit boards around the LCD panel perimeter, the wires, and media player hardware of the door assembly, allowing the complete system to be conveniently housed inside the door. The "LCD door" can be used for advertising merchandise, nutritional value, pricing, etc.

In accordance with a first aspect of the present invention there is provided a door assembly that includes a single glass unit having at least first, second and third panels, a front surface, a rear surface, and an outside edge. At least one of the first, second or third panels is a transparent LCD panel on which media can be displayed. The single glass unit also includes a frame that at least partially surrounds the outside edge of the single glass unit, and electronic components in electrical communication with the LCD panel. In a preferred embodiment, the second panel comprises the transparent LCD panel and is positioned between the first and third panels and the first panel is spaced from the second panel by a first spacer and the third panel is spaced from the second panel by a second spacer. The first, second and third panels each have an outside edge and a length and a width. The length and the width of the second panel is smaller than the length and the width of the first and third panels, thereby defining a margin between the outer edge of the second panel and the outer edges of the first and third panels. The first panel is spaced from the third panel by a third spacer that is positioned within the margin.

In a preferred embodiment, the single glass unit includes insulation disposed within the margin and between the first and third panels and the second panel is hermetically sealed between the first and third panels. Furthermore, the first panel includes an outer opaque section and an inner transparent section through which the second panel is visible. In one embodiment, the electronic components for running the LCD panel are disposed between the first and third panels. In another embodiment, the electronic components are positioned in the rail and the rail includes a removable cover for accessing the electronic components. In an embodiment, one of the panels includes an electro-conductive film thereon that is generally clear, wherein when a voltage is applied across a portion of the film, the film becomes opaque. In an embodiment, the electronic components are powered by 24V DC.

DETAILED DESCRIPTION OF THE PREFERRED EMBODIMENTS

Figure 1:
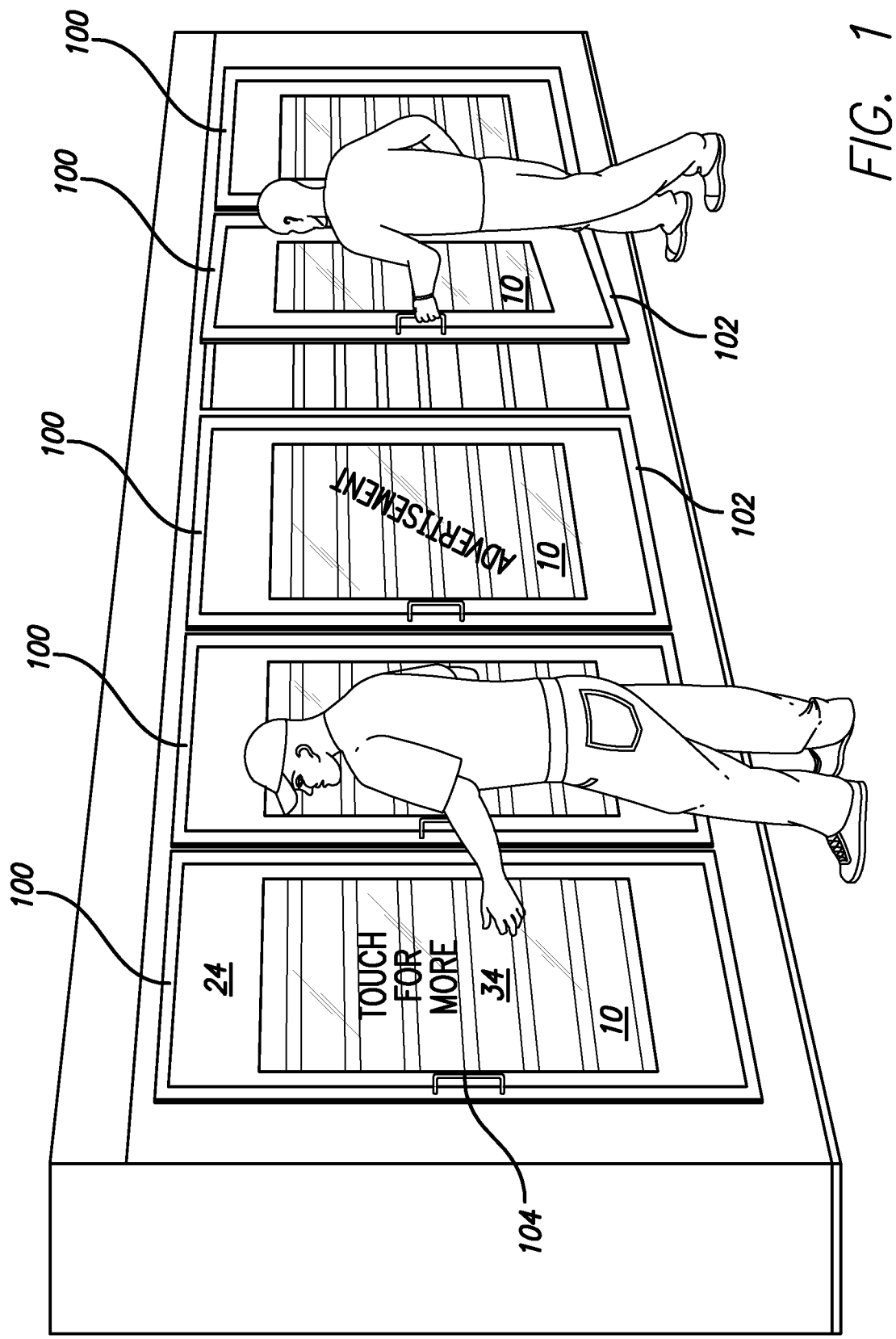
FIG. 1 is a perspective view of a series of refrigerated display cases that each include a door assembly with single glass unit having a center LCD panel.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The use of the phrase "in one embodiment" or "in another embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Figure 2:
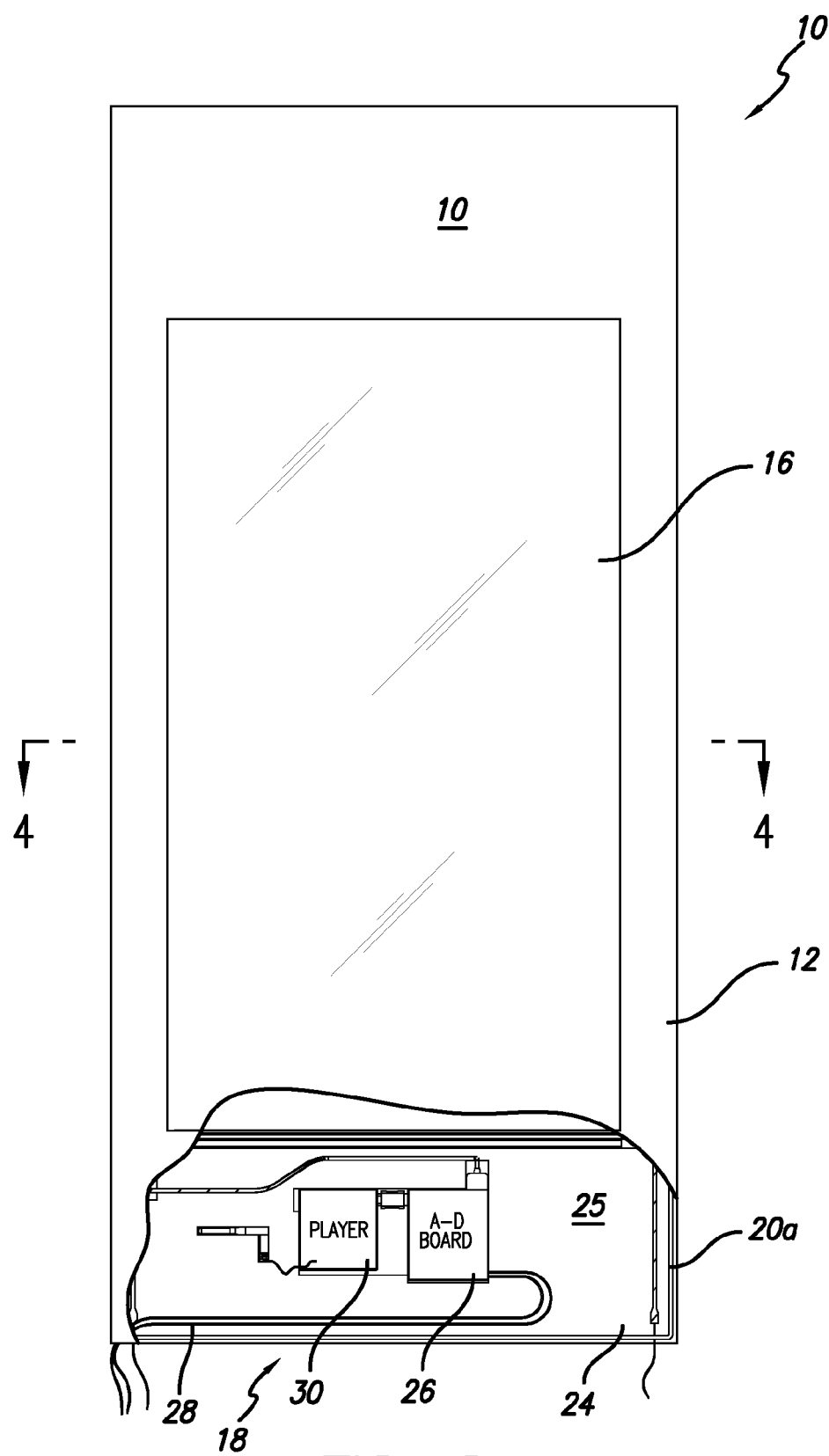
FIG. 2 is a front elevational view of one of the single glass unit having a center LCD panel of FIG. 1 with a portion of the front outer pane cut away to show the electronic components.
Figure 3:
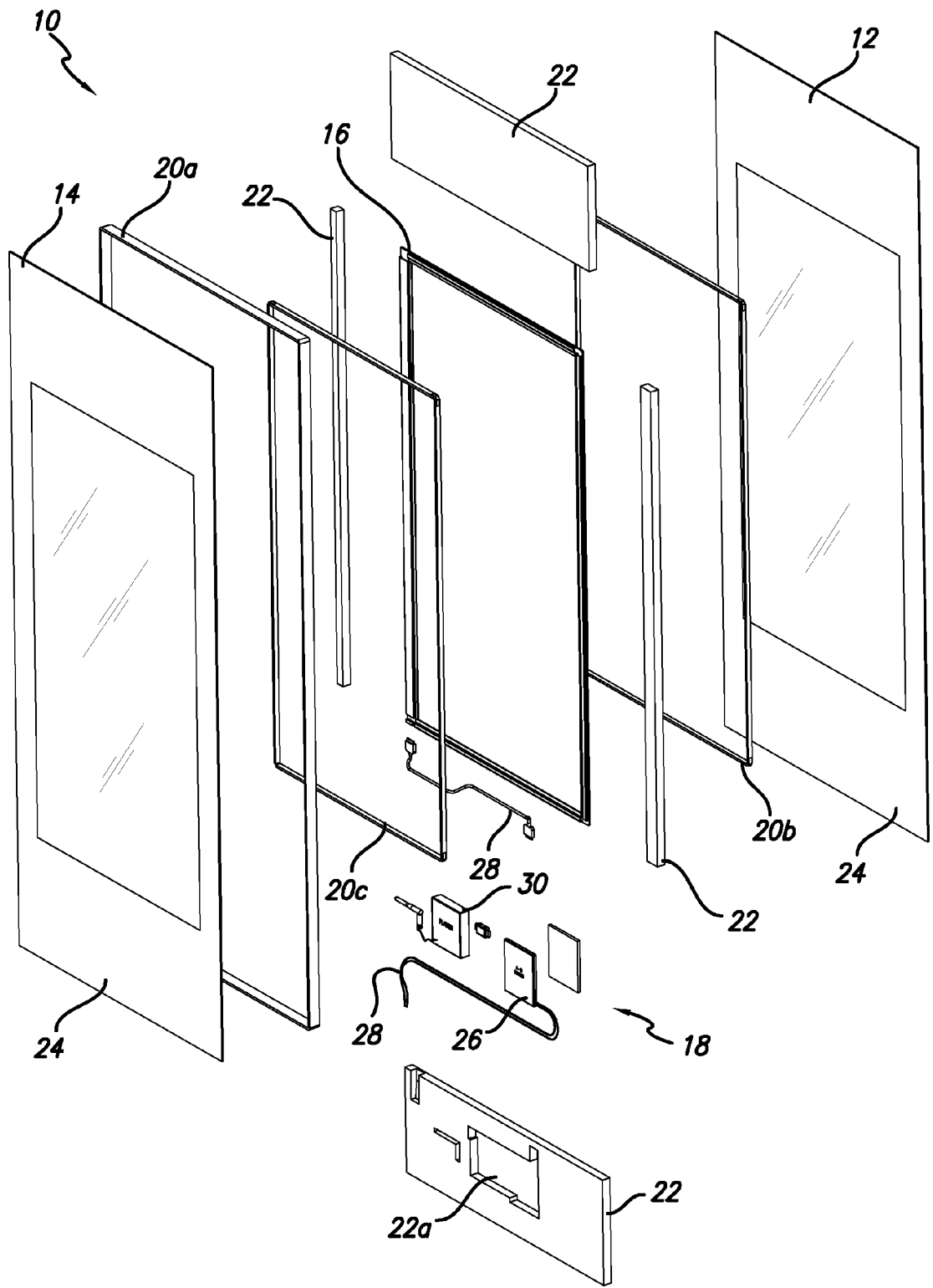
FIG. 3 is an exploded perspective view of the single glass unit of FIG. 2.
Figure 4:
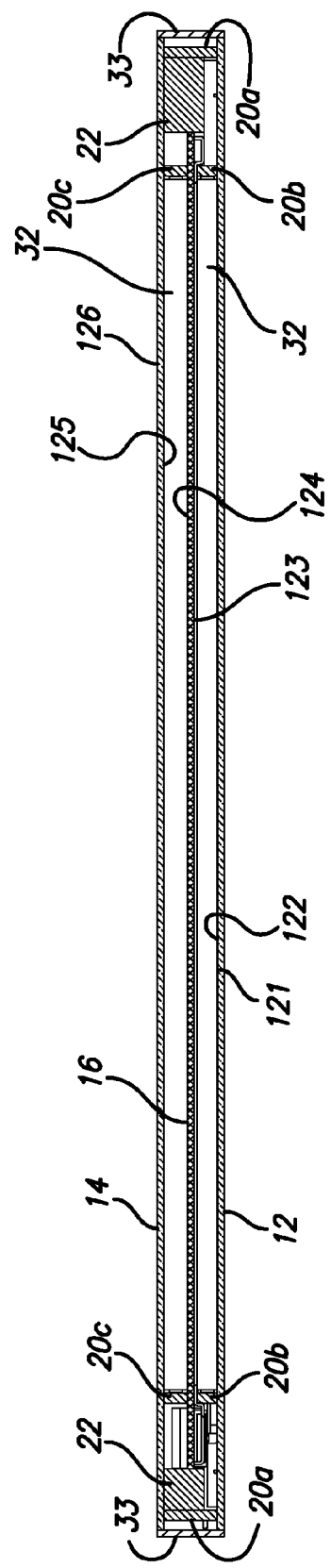
FIG. 4 is a cross-sectional view of the single glass unit of FIG. 2 taken along line 4-4 of FIG. 2.

FIG. 1 shows a series of refrigerated display case doors 100 that include a three-pane unit, single glass unit or package 10 with a transparent LCD panel 16 associated therewith. FIGS. 2-4 show the single glass unit 10 with front/outer pane 12, rear/inner pane 14 and center transparent LCD panel 16. It will be understood that in FIGS. 2-4 and 8, the outer perimeter or frame 102 of the door 100 is not shown. In a preferred embodiment, the panes are glass. However, any transparent material, such as plastic, can be used.

As shown in FIG. 3, in a preferred embodiment, the single glass unit 10 includes front and rear panes 12 and 14, LCD panel 16, electronic components 18, spacers 20a, 20b, 20c, and insulation 22. In a preferred embodiment, the front and rear panes 12 and 14 include an opaque section 24 that obscures or hides components inside the unit 10. For example, by providing the opaque section 24 (preferably done by screen printing or some other type of coating) on selected areas of one or more of the panes 12 and/or 14, the spacers 20a, 20b, 20c insulation 22, electronic components 18 and other components can be housed inside the unit 10 (and the door 100) and hidden from view. Thermal insulation 22 may be added in certain areas to maintain the overall thermal performance of the door.

Each panel 12, 14 and 16, has a front and rear surface, For ease of description, these are described herein and depicted in FIG. 4 as surfaces 121, 122, 123, 124, 125 and 126. It will be appreciated by those skilled in the art that in use surface 121 faces the customer and surface 126 faces the interior space of the display case.

In a preferred embodiment, the opaque section 24 on the front and rear panes 12 and 14 (or dot matrix decorating, etc.) is placed on surfaces 122 and 125 to hide the components therein and the margin of the LCD panel, etc. However, this is not a limitation and the opaque section(s) can be placed on any desired surface.

It will be understood that the LCD panel may include a number of different layers or panes of glass/plexiglass or the like laminated to one another. Accordingly, as used herein, the LCD panel can be a single layer or multi-layer panel that includes an LCD screen for playing media. For example, the LCD screen may include a layer of glass adhered thereto to improve strength and reduce flex when the door is slammed. This can add strength to the LCD panel by essentially making it a double laminated panel. In a preferred embodiment, the LCD panel 16 has an aluminum rail therearound.

Figure 8:
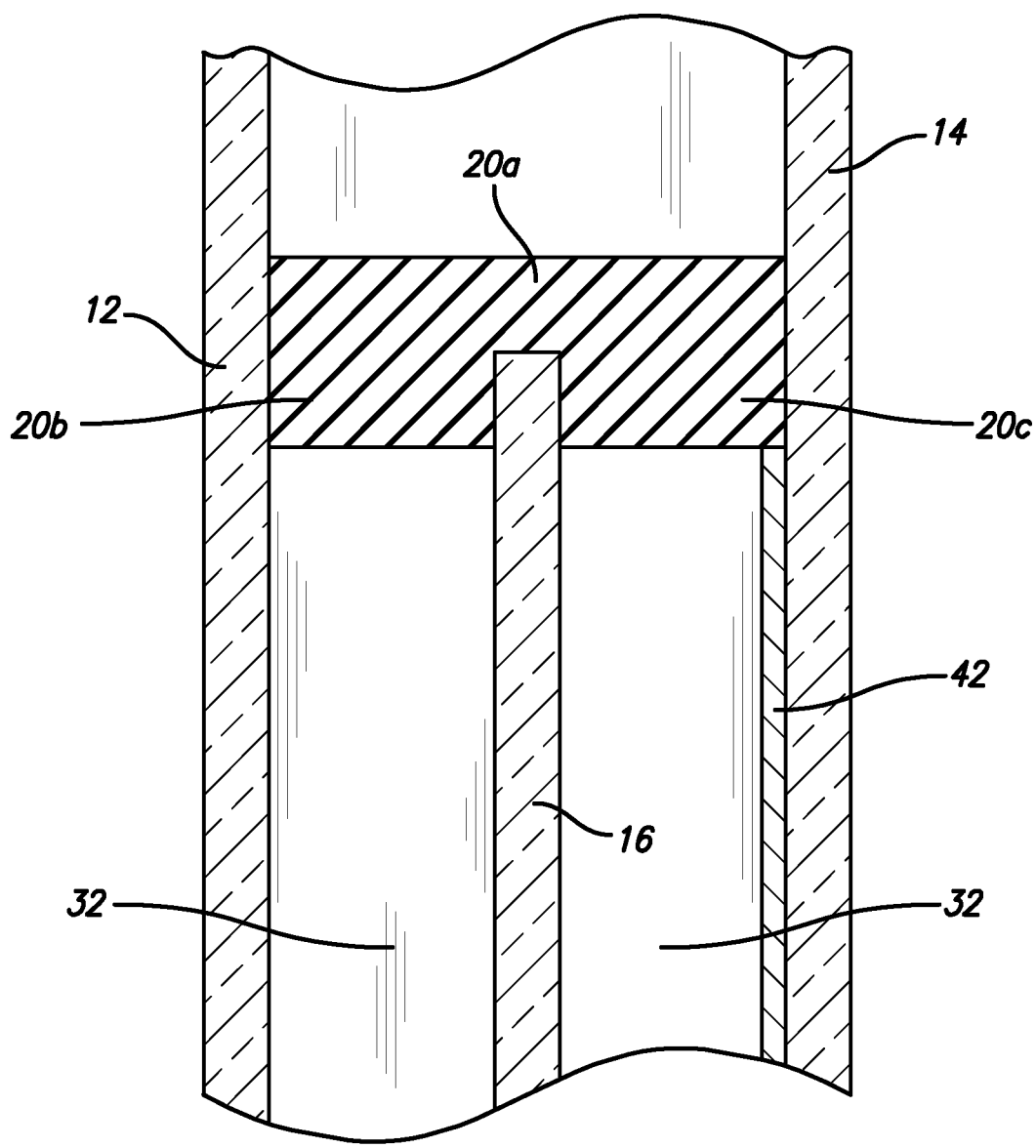
FIG. 8 is a cross-sectional side view of a portion of the single glass unit of FIG. 2 with a different spacer.

In a preferred embodiment, as shown in FIG. 3, unit 10 includes at least three different spacers 20a, 20b and 20c. Spacer 20a spans the space between the front and rear panels 12 and 14, spacer 20b spans the space between the front panel 12 and the LCD panel 16, and spacer 20c spans the space between the rear panel 14 and the LCD panel 16, as is shown in FIG. 4. It will be understood that the spacers 20a, 20b and 20c are adhered to a surface of the panel 12, 14 or 16. For example, spacer 20a is adhered to the inner surfaces of front panel 12 and rear panel 14. In a preferred embodiment, the spacers 20a, 20b and 20c are made of an elastomeric material. However, this is not a limitation on the present invention. The spacers can be made of other materials, such as a polymer, a metal such as aluminum, etc. The elastomeric material or spacers 20b and 20c supports and suspends the LCD panel 16 inside the door and between the front and rear panels 12 and 14, thus helping prevent damage from shock and vibration when the door 100 closes. In another embodiment, the spacers 20a, 20b and 20c can be formed as a unit, as shown in FIG. 8 and as shown in U.S. Pat. No. 6,148,563, the entirety of which is incorporated herein by reference. In this embodiment, the front and rear panels 12 and 14 are spaced from the center panel by spacers 20b and 20c, but they are also connected by spacer 20a. This essentially forms a single spacer with a detent in the middle for receiving the LCD panel 16.

Figure 7:
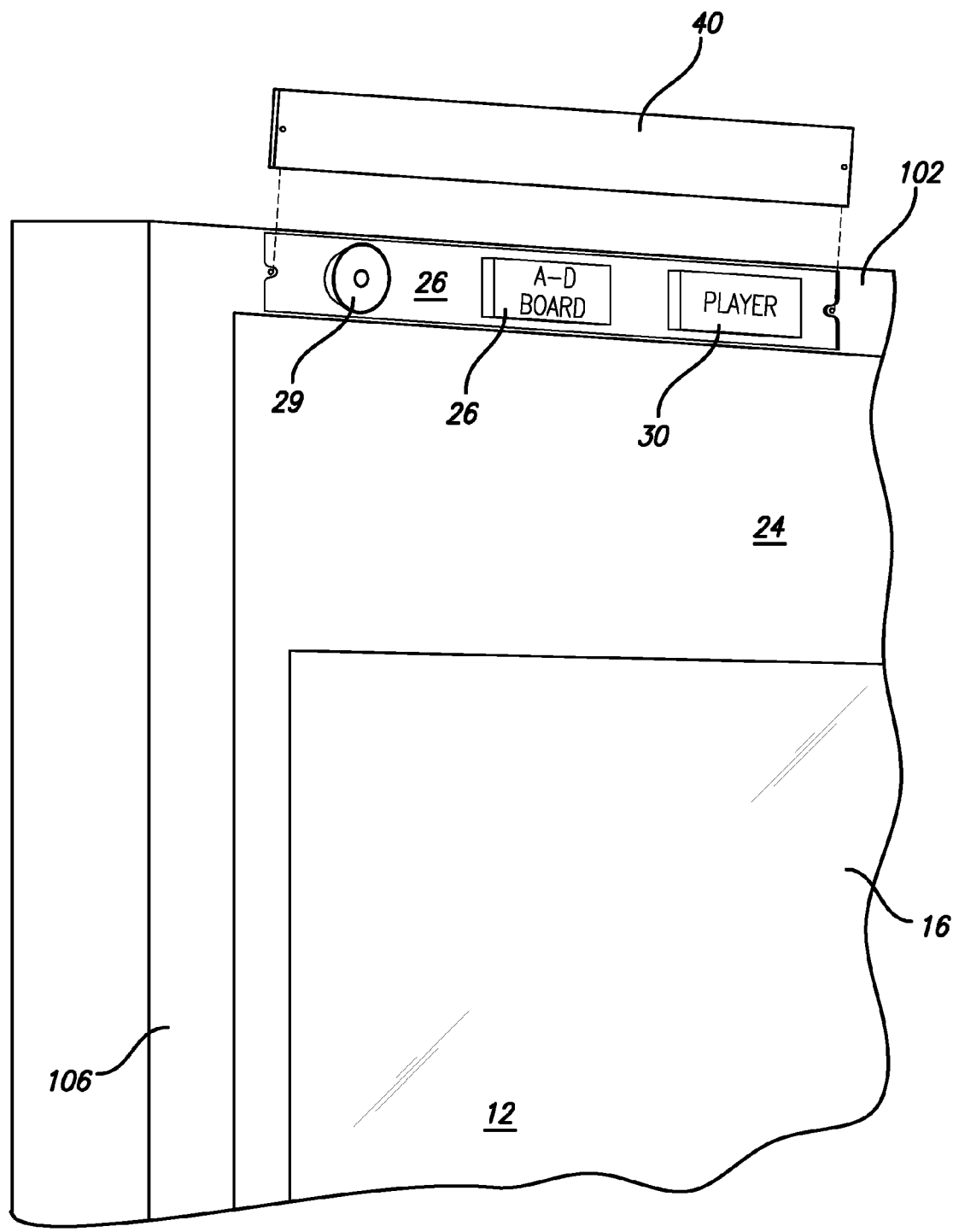
FIG. 7 is a detailed view of a portion of a door assembly showing the electronic components mounted in the rail of the door and having the cover exploded therefrom.

When incorporating a single glass unit 10 with a transparent LCD panel 16, the door includes components 18 for operation of the LCD screen. As shown in FIGS. 2 and 4, in a preferred embodiment, the LCD panel 16 is smaller (length and width dimensions) than the outer panes 12 and 14. This provides space or a margin 25 around the perimeter of the LCD panel 16 for housing the components 18. For example, the unit 10 or door 100 can include circuit board(s) 26 (labeled A-D board in FIG. 2), wires or cables 28, a media player 30 (that includes a hard drive with memory and appropriate software) and associated connectors and such for providing media and/or power to the LCD panel 16. In another embodiment, the unit 10 can include one or more speakers 29, as shown in FIG. 7. In a preferred embodiment, components 18 are positioned within the margin 25 under the LCD panel 16. However, this is not a limitation on the present invention and the components 18 can be positioned as desired. See, for example, FIG. 7, where the components are positioned in the rail of the door, which is described more fully below.

In a preferred embodiment, insulation 22, such as insulating foam, is added to at least some of the margin 25 (the two-pane regions) to achieve improved insulation. However, this is not a limitation on the present invention. For example, the door can include molded polyurethane foam, polystyrene bead or extruded polystyrene or the like. As shown in FIG. 3, one of the pieces of insulation 22, can include openings or cut outs 22a therein for housing at least a portion of the electronic components 18. FIG. 4 is a sectional top plan view of unit 10 showing the insulation 22 between the inner and outer panes 12 and 14. Other types of insulation, such as superinsulation (e.g. silica aerogel) can be used in the areas where bulky and conductive electronic components 18 require greater insulation in limited space to prevent external condensation in the refrigerator or freezer.

Figure 5:
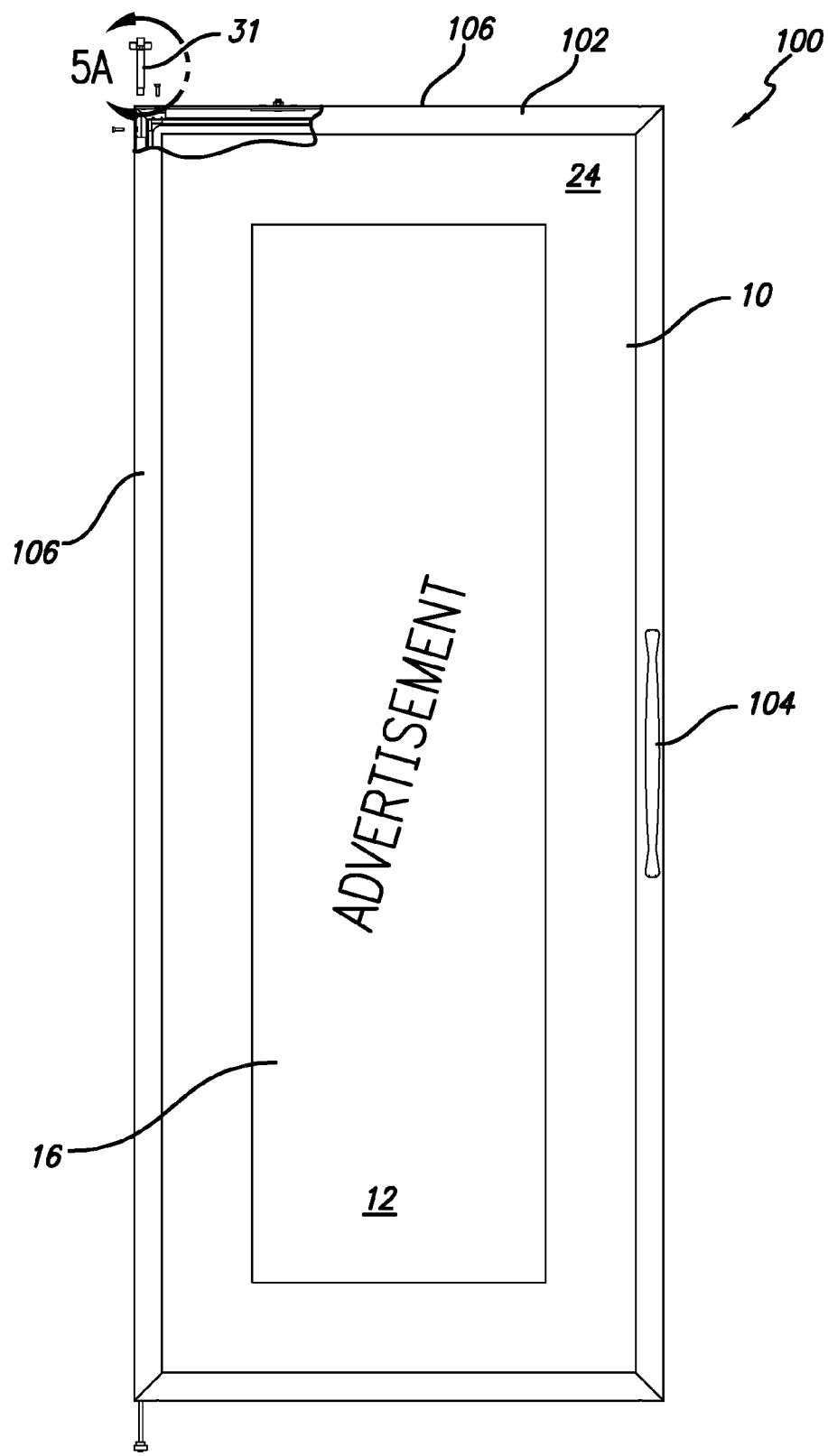
FIG. 5 is a front elevational view of the single glass unit of FIG. 2 mounted in the door of a refrigerated display case.
Figure 5A:
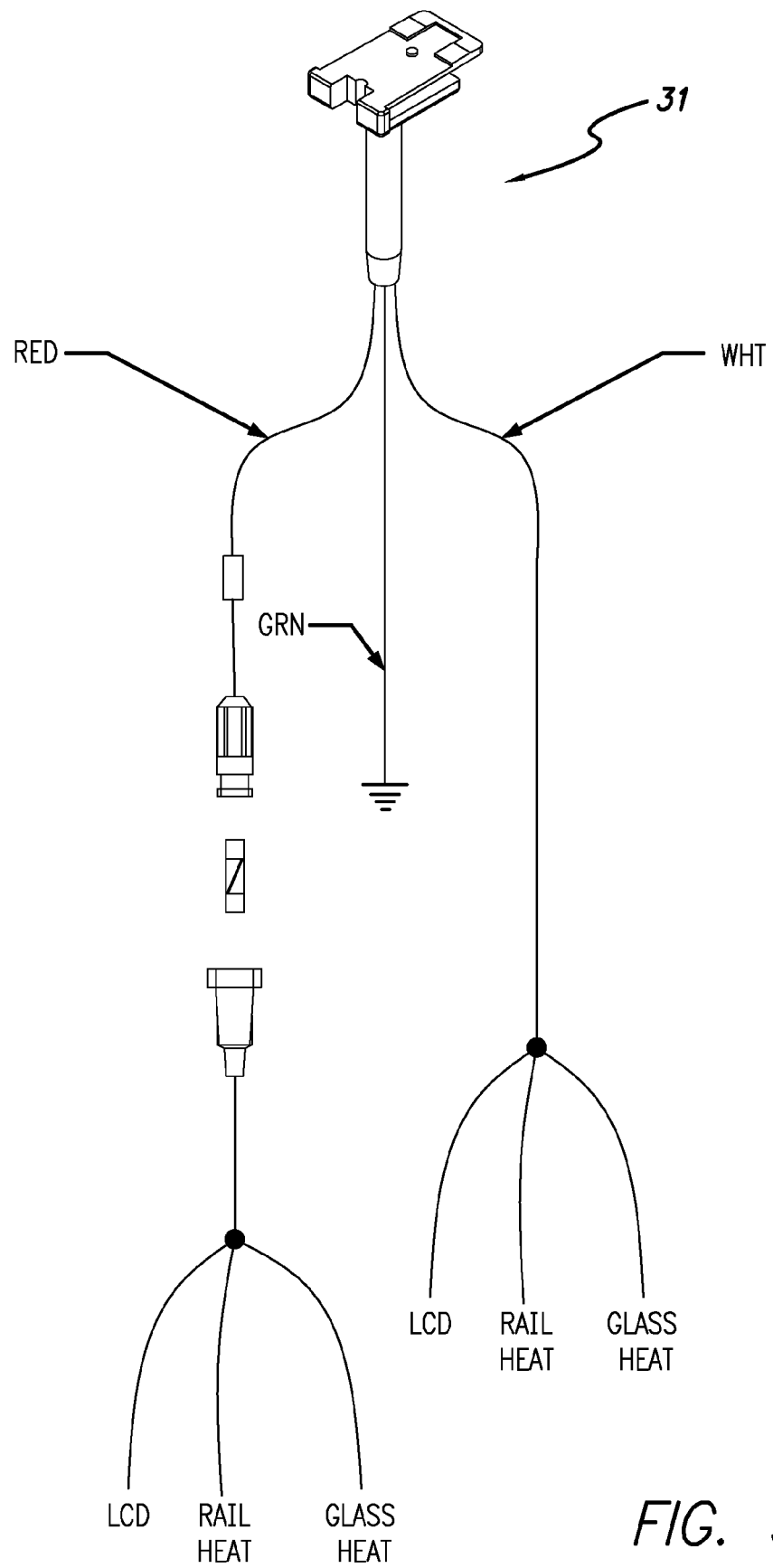
FIG. 5A is a detailed view of the electrical hinge pin of the door of FIG. 5.

It will be understood that the single glass unit 10 can be modified as necessary to fit within any type of door to be used in a refrigerated display case or the like. FIG. 5, shows the unit 10 within an exemplary door assembly 100. The door preferably includes a handle 104 to open or close and alternately seal or unseal the interior space of the display case. Typical display cases include numerous other structures for attaching the door(s) to the display case, as well as features for housing wiring, mullions, gaskets and other associated brackets and components that are typically included in refrigerated display cases. These features are well known in the art and will not be discussed in detail herein. An example of such components are discussed in U.S. Pat. Nos. 6,606,832, and 6,606,833 the disclosures of which are incorporated by reference herein in their entireties.

As discussed above, in a preferred embodiment, unit 10 includes a media player 30 for controlling and playing media on the LCD panel 16. Data can be provided to the media player 30 via wires or cables or wirelessly, e.g., Wi-Fi, 802.11:x, etc., as desired (with the appropriate transmitter and/or receiver). In a preferred embodiment, the media player 30 includes a solid-state drive to prevent a spinning hard drive from failing when the door is slammed. However, this is not a limitation on the present invention and a spinning hard drive or other type of drive can also be used. Wireless (or wired) communications with the media player 30 can be used to deliver desired content to be played on the LCD panel 16, e.g, advertising content, nutritional content, special offers, etc. For example, the invention can implement IP addressable communications so an advertiser can remotely feed new data over the Internet. Furthermore, this allows remote monitoring of the health of the hard drive of the media player and associated electronic components.

In a preferred embodiment, the case into which the door 100 is mounted is pre-wired with low-voltage DC power supply, e.g. 12V, 24V, UL Class 2, etc. so that it accepts a transparent LCD door 100 with power through the hinge pin 31, or wired cords near the rotating hinge pin. However, this is not a limitation on the present invention. For example, a high-voltage option can also be implemented. As shown in FIG. 5, insulated electrical conductors and/or wired communications (for the media player 30 and associated components) can be directed through the hinge pin 31 (e.g., via TCP/IP-type Internet communications).

One feature of a preferred embodiment of the invention is to provide an electrical hinge pin 31, similar to the '582 patent hinge pin, but replacing the AC conductors of the '582 patent with low-voltage DC conductors and a data cable. The elimination of the high voltage AC conductors makes more space available in the hinge pin 31 for both the low-voltage DC antisweat heat and powering the electronics, and a data cable, e.g. Cat 5 with TCP/IP type communications. The low voltage conductors (e.g., 24V DC) can be used to power all electronic components, such as the components 18 for the LCD panel 16, heated glass, anti-sweat perimeter heating, etc. In another embodiment, the electrical hinge pin can be omitted and a regular hinge pin can be used. For example, in an outside mount embodiment of the door, the electronic components can be powered by (and data communicated therewith) a cord that does not run through the hinge pin. This type of door may be used, for example, on a self serve case at the end of a check out aisle in a store.

In a preferred embodiment, (and preferably in low-temp applications), an insulating gas, such as argon, xenon or other insulating gas can be used to fill the inner and/or outer cavities 32 between the LCD panel 16 and the front and rear panes 12 and 14, as shown in FIG. 4 (and other voids or cavities within the unit 10). In a preferred embodiment, the gas-filled inner cavities 32 are hermetically sealed (see seal 33 in FIG. 4) to keep from contaminating the transparent LCD panel 16 with dust, residue or outgassing from the outer insulated cavity containing insulation and electronics.

The thickness of the unit 10 can be different for different applications. However, in an exemplary embodiment, the overall thickness of the unit 10 is preferably about 0.125", with the front and rear panes 12 and 14 being about 0.125" thick and the center LCD pane 16 being about 0.125" thick. These dimensions are not a limitation on the present invention.

In a preferred embodiment, any of the panes/panels 12, 14 or 16 can include an electro-conductive coating, such as a pyrolitic coating that is applied by spraying. It will be appreciated by those skilled in the art that other electro-conductive coatings can be used and can be adhered, applied, laminated or the like on a desired surface. For example, a chemical vapor deposition technique can be used. However, this is not a limitation on the present invention.

To provide electricity to the coating, the unit 10 preferably includes top and bottom or side bus bars, which are vertically spaced from one another and are adhered to the coating. Each bus bar preferably includes a lead assembly or solder tab for adhering wires that are in communication with an electrical source. With this arrangement, electrical power moves through one of the lead assemblies to one bus bar, across the coating, to the other bus bar and through the other lead assembly to heat the pane or the entire unit to help prevent condensation. Similar bus bars are described in U.S. Pat. Nos. 6,606,832, and 6,606,833, referenced above.

In a preferred embodiment, panes 12, 14 and 16 are preferably designed to maximize visible light transmission from inside the case to the customer, thereby improving the ability of customers to view display items. However, it is also desirable to minimize the transmission of non-visible light (i.e., ultraviolet and infrared light) through glass unit 10 from outside to inside the case in order to improve thermal performance and to protect items therein. Coolers are a type of refrigerated display case which operate at a temperature of approximately 38° F. Freezers are another type of refrigerated display case which operate below 0° F. When the glass unit 10 of such display cases comes into contact with ambient air, the relatively colder glass unit 10 can cause moisture in the air to condense on the surfaces of the glass unit. Thus, besides the use of the electro-conductive coating described above, it is desirable to use the non-visible wavelengths of light to heat the glass panels, thus reducing or preventing condensation. In a preferred embodiment, the panes 12, 14 and 16 can also include a UV inhibitor, which can help increase the shelf life of products inside. Also, panes 12, 14 and 16 may include low-emissivity heat-reflective coatings to improve overall thermal resistance and/or prevent external condensation. In an embodiment where reflection is an issue, an anti-reflective coating can be applied to any of the panes the glass unit 10.

Figure 6:
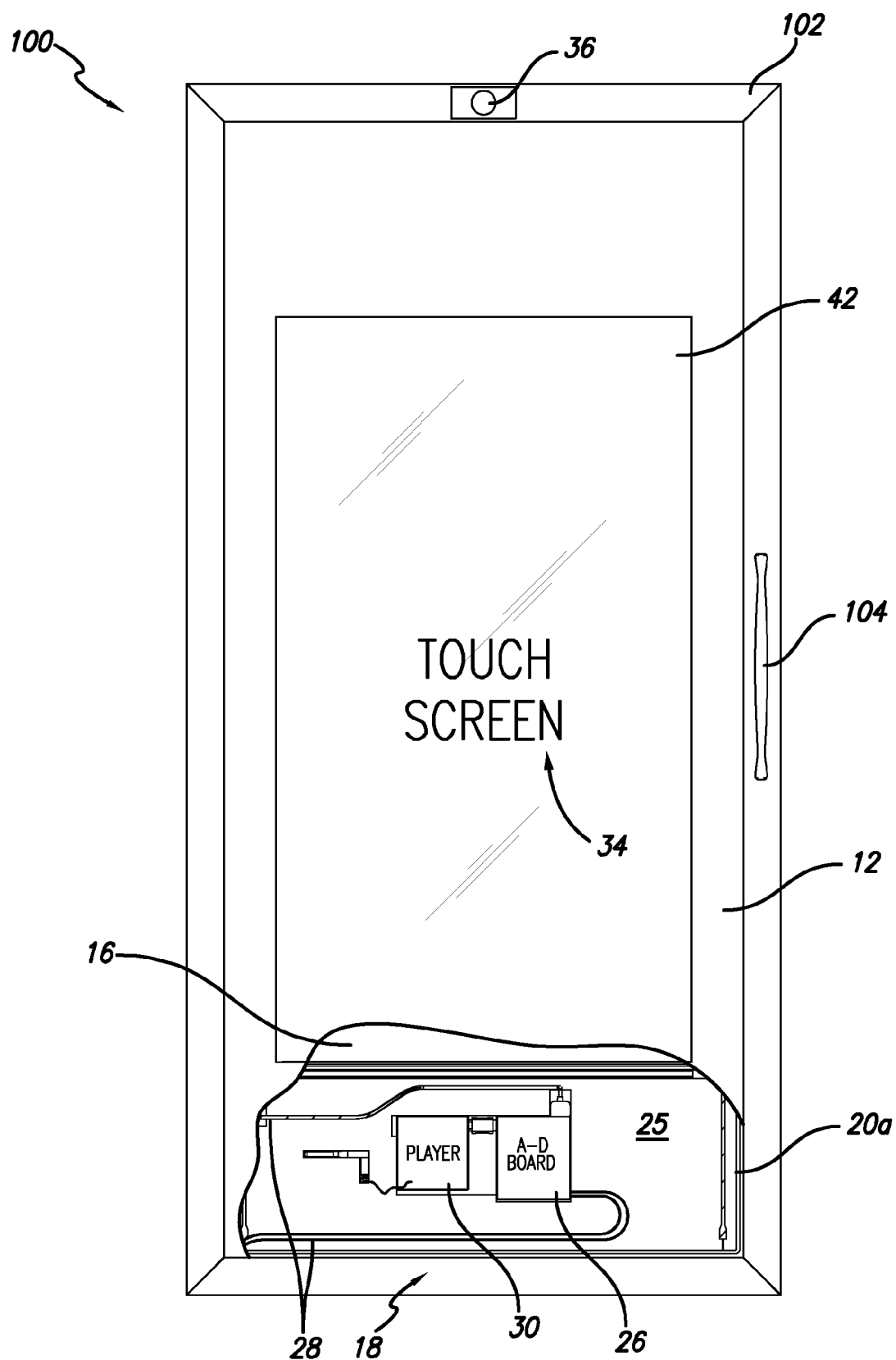
FIG. 6 is a front elevational view of a door assembly with a transparent LCD panel in accordance with another embodiment of the present invention.

In a preferred embodiment, touch screen technology 34, as shown in FIGS. 1 and 6, can be used. Exemplary touch screen technology is disclosed in U.S. Patent Publication Nos. 2009/0146945 and 2007/0216657, the entireties of which are incorporated by reference herein. In this embodiment, a user can touch the front of the outer panel 12 and access information as desired. In various embodiments, the entire outer panel 12 can incorporate touch screen technology or only various portions of the outer panel 12 can include touch screen technology. For example, the user can access nutritional information about the contents of the case or the user can access information about the layout of the store.

In a preferred embodiment, the unit 10 includes motion sensor technology, such as a visual recognition camera 36, as shown in FIG. 6. In this embodiment, the media player 30 only plays content on the LCD panel 16, when a person walks by or in front of the unit 10. In an exemplary embodiment, the unit 10 can include software that allows the camera 36, and/or the components thereof, to recognize if a man or a woman is standing in front of the door 100. Therefore, the advertisement or other media played on the LCD panel 16 can be tailored to the specific gender of the person standing in front of the door 100.

The single glass unit 10 can be used in other insulated glass assemblies for refrigerators/freezers. For example, the single glass unit 10 can be implemented in a sliding door for a multi-deck refrigerator, a fixed insulated glass "end" window for a multi-deck refrigerator, a fixed window for a walk-in cooler, an insulated service deli case window/door, an insulated single-deck, low-temp island case sliding lid, etc.

In another preferred embodiment, two or more smaller screens can be combined in a matrix to increase the visible display area. For example a 46" 16:9 standard TV size in a 30"×67" door leaves a large opaque margin top and bottom. Two smaller adjacent panels would leave more space for visible transmittance. Another way to increase the visible area is to cut down the long side of a larger 16:9 LCD panel such that it better fits the typical 67" or 75" vertical height but would otherwise exceed the standard 30" width.

In another embodiment, a series of doors can be synchronized to display one images or related images on each of the doors, similar to a JumboTron that displays an image or images on a series of synched screens. In this embodiment, a central control unit that is in electrical communication (wired or wirelessly) with electrical components within each door can be used.

Furthermore, the LCD panel does not have to be the center panel. In other embodiments, the LCD panel can be the inside or outside panel. For example, a transparent LCD screen can be adhered or laminated to the outside panel or the inside panel of a triple pane refrigerator door. In another embodiment, the unit 10 can include more than three panels or panes. For example, the LCD panel 16 can be inserted between the first and second or second and third panels in a triple pane refrigerator door.

In a preferred embodiment, a separate pocket is created in the margin of the door outside the hermetic seal of the insulated glass, that would allow access to the media player and related electronic components 18 for service or upgrade. This can be implemented by using an "offset" insulated glass package/unit (e.g. pane number three is smaller than pane number one) to create the pocket to contain the media player or other electronics to allow service. However, the glass package/unit does not have to be offset. In another embodiment, as shown in FIG. 7, the pocket 38 is created or defined in the hollow area made by the rail 106. As shown, the rail 106 can include a cover 40 that is removably attached to the rail 106 by threaded fasteners or the like. The cover 40 can be removed to allow access to the pocket 38 and the electronic components 18 therein, thus allowing repair, upgrade, replacement, etc. In FIG. 7, the pocket 38, cover 40 and components 18 are shown in the top rail 106 of the door 100. However, the pocket 38, cover 40 and components 18 (such as speaker 29) can be mounted in any rail or portion of the frame. In another embodiment, the electronic components for running the LCD panel can be mounted in the display case or refrigerator.

In another preferred embodiment, the unit 10 includes a switchable film or glass 42 disposed or laminated on at least one of the surfaces of the front or rear panels 12 and/or 14, as shown in FIGS. 6 and 8. In a preferred embodiment, the film is disposed on surface five, which is the front surface of the rear panel 14. The panel with the switchable film 42 can be formed by laminating a liquid crystal switchable film thereon or the film can be directly mounted on the panel with a double sided tape, optical glue or the like. In use, a voltage is selectively applied to the film to make it either clear or opaque as desired. In a preferred embodiment, if a voltage is applied to the film, it goes clear and if no voltage is applied it is opaque or frosted. Therefore, in use, if no voltage is applied, images on the clear LCD panel look like a regular television, which helps accentuate the images on the transparent LCD panel and eliminate the distracting contrast of the product in the display case. Then when a voltage is applied, the film goes clear and the product in the case is easier to see. In another embodiment, the film 42 is disposed on the front or center panels. In another embodiment, the film 42 is disposed on another panel, such as a fourth panel. In another embodiment, the single glass unit includes only two panels, one of which is the LCD panel and the other includes the switchable film 42. This type of unit can be used in non-door applications, such as in department store windows, etc. where the window is desirable to be transparent at times and opaque at other times to better see the media on the LCD panel. As will be appreciated by those skilled in the art, appropriate wiring and the like can be associated with the film 42 to supply the voltage. In a preferred embodiment, switchable film 42 is backlit with the display case lighting.

An exemplary switchable film is the 3G Switchable Film™ available from Scienstry, Inc. of Richardson, Tex., USA. Another switchable film is described in U.S. Pat. No. 5,270,843, the entirety of which is incorporated herein by reference.

In an embodiment, the door 100 can include a light guide plate (made of glass, plexiglass or the like) that helps illuminate (preferably via LED lighting) the images on the LCD panel. Other types of lighting for LCD panel are also within the scope of the invention.

In another embodiment of the invention, the glass unit may be a laminated glass unit without any space between the panes, as is shown in U.S. Patent Publication No. 2010/0043293, the entirety of which is incorporated herein by reference. Also, the display case may or may not be refrigerated.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim foil is, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A display case door assembly for a temperature-controlled storage device, the display case door assembly comprising:
    an insulated single glass unit that includes at least first, second, and third panels, wherein the second panel is positioned between the first and third panels, the second panel comprising a transparent LCD panel on which media can be displayed and through which products within the temperature-controlled storage device are visible, wherein the single glass unit has a front surface, a rear surface, and an outside edge, and wherein the single glass unit comprises a thermally insulating medium between the first and third panels,
    a frame that at least partially surrounds the outside edge of the single glass unit, and
    electronic components in electrical communication with the LCD panel, the electronic components comprising a media player configured to control the media displayed on the LCD panel,
    wherein the single glass unit, the frame, and the electronic components are configured to move, as a unit, between a closed position in which the single glass unit provides thermal insulation for the temperature-controlled storage device while displaying media on the transparent LCD panel and an open position in which the products within the temperature-controlled storage device are accessible.

2. The door assembly of claim 1 wherein the first panel is spaced from the second panel by a first spacer and the third panel is spaced from the second panel by a second spacer,
    wherein the first spacer is adhered to both the first panel and the second panel and spans a distance between the first panel and the second panel, and wherein the second spacer is adhered to both the second panel and the third panel and spans a distance between the second panel and the third panel.

3. The door assembly of claim 1 wherein the first, second and third panels each have an outside edge and a length and a width, wherein the length and the width of the second panel is smaller than the length and the width of the first and third panels, thereby defining a margin between the outer edge of the second panel and the outer edges of the first and third panels, and wherein the first panel is spaced from the third panel by a third spacer that is positioned within the margin.

4. The door assembly of claim 3 wherein the first, second and third spacers are made of an elastomeric material.

5. The door assembly of claim 3 wherein the thermally insulating medium includes insulation disposed within the margin and between the first and third panels.

6. The door assembly of claim 5 wherein the thermally insulating medium includes an opening therein for housing at least a portion of the electronic components.

7. The door assembly of claim 3 wherein the electronic components are disposed within the margin between the first and third panels.

8. The door assembly of claim 1 wherein the second panel is hermetically sealed between the first and third panels.

9. The door assembly of claim 8 wherein the thermally insulating medium comprises an insulating gas disposed between the hermetically sealed first and third panels.

10. The door assembly of claim 1 wherein the first panel includes an outer opaque section and an inner transparent section through which the second panel is visible.

11. The door assembly of claim 1 wherein the electronic components are disposed within the frame.

12. The door assembly of claim 11 wherein the frame includes a rail secured adjacent at least a portion of the outside edge of the single glass unit, wherein the electronic components are positioned in the rail, and wherein the rail includes a removable cover for accessing the electronic components.

13. The door assembly of claim 1 further including a case, wherein the frame is hingedly connected to the case by an electrical hinge pin, wherein the electrical hinge pin supplies electricity and data to the electronic components.

14. The door assembly of claim 1 wherein the media player is configured to display at least one of product information, pricing information, nutritional information, advertising information, and store layout information on the transparent LCD panel.

15. The door assembly of claim 1 wherein at least one of the panels includes switchable film thereon that is generally clear, wherein when a voltage is applied across a portion of the film, the film becomes opaque,
    wherein the electronic components are configured to transition the switchable film between a transparent state to improve a visibility of products within the temperature-controlled storage device and an opaque state to improve a visibility of the media displayed on the LCD panel.

16. The display case door assembly of claim 15, wherein the electronic components are configured to coordinate the media displayed on the LCD panel with a state of the switchable film, wherein coordinating the media comprises displaying media on the LCD panel when the film is in the opaque state and not displaying media on the LCD panel when the film is in the transparent state.

17. The door assembly of claim 1 wherein at least one of the first or third panels includes an electro-conductive coating thereon, wherein the coating is configured to generate heat when a voltage is applied across the coating, thus helping prevent condensation thereon.

18. The door assembly of claim 1 further comprising a motion sensor in electrical communication with the media player, wherein the media player is configured to display media on the transparent LCD panel in response to an input from the motion sensor.

19. The door assembly of claim 18 wherein the motion sensor includes a camera mounted in the frame.

20. The door assembly of claim 1 wherein at least one of the first panel and the third panel comprises a touch-sensitive panel in electrical communication with the media player, wherein the media player is configured to control the media displayed on the transparent LCD panel in response to a user input received via the touch-sensitive panel.

21. The door assembly of claim 1 wherein the electronic components are powered by a power supply that outputs a voltage of no greater than 60 V DC.

* * * * *